Oct. 25, 1955     R. H. BROWN     2,721,994
SELF-BALANCING ELECTRO-MAGNETIC PROXIMITY DETECTOR
Filed Nov. 14, 1952
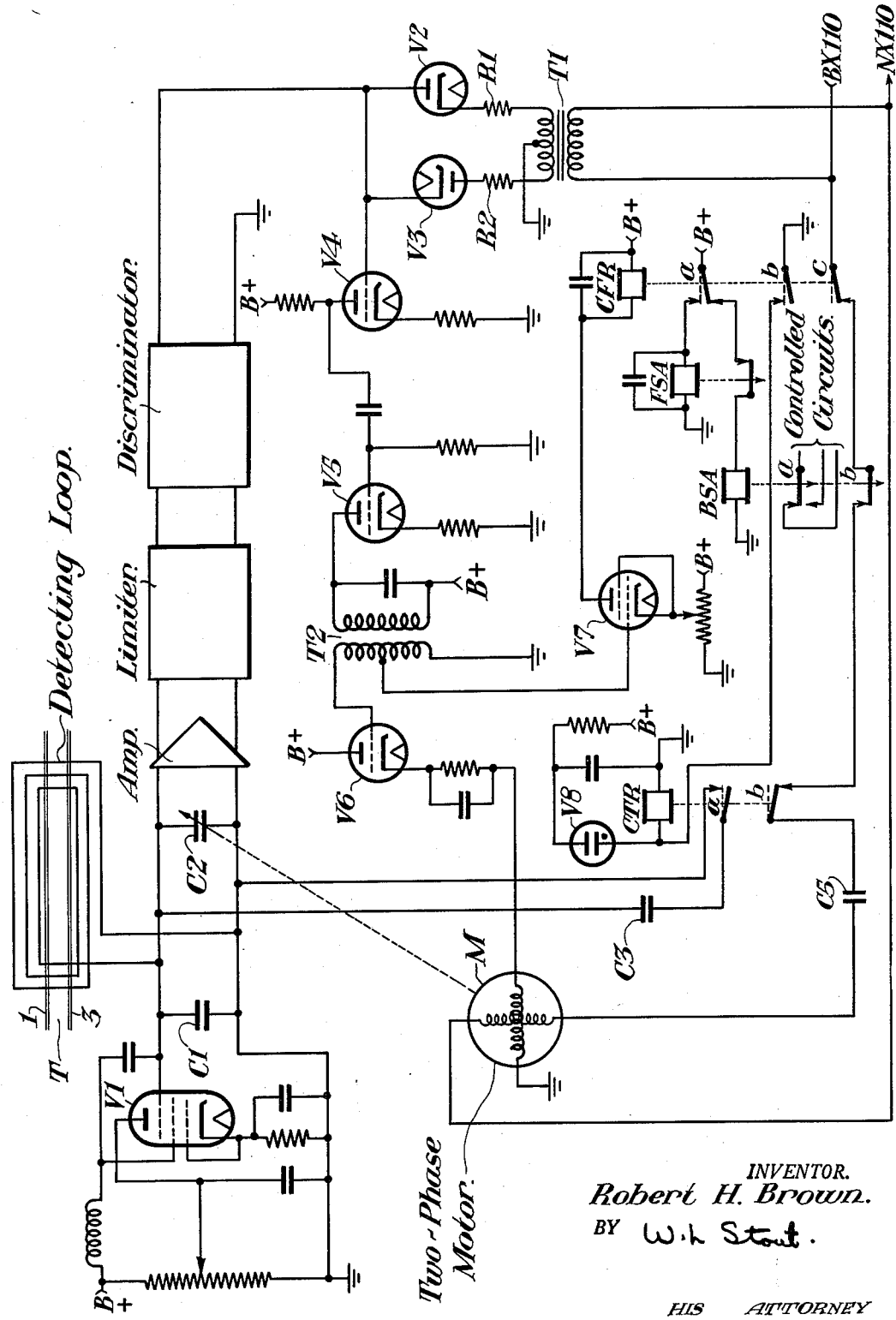
INVENTOR.
Robert H. Brown.
BY W. H. Stout.
HIS ATTORNEY

United States Patent Office 2,721,994
Patented Oct. 25, 1955

2,721,994

SELF-BALANCING ELECTRO-MAGNETIC PROXIMITY DETECTOR

Robert H. Brown, Westview, Pa., assignor to Westinghouse Air Brake Company, Wilmerding, Pa., a corporation of Pennsylvania Application November 14, 1952, Serial No. 320,596

3 Claims. (Cl. 340—258)

My invention relates to proximity detectors, and particularly to an improved type of electro-magnetic proximity detector which is arranged to operate on a "fail-safe" basis and is also arranged so that it is self-balancing with respect to slow variations due to weather changes or other changes which occur at a relatively low rate.

Proximity detecting means of the type embodying my invention is particularly applicable, but not limited to, the detection of a car or vehicle upon a section of railway track, which section cannot be equipped with the usual track circuit to detect the presence of a car or vehicle.

It has previously been proposed to provide systems of the general type described, in which the presence of an object within a predetermined space is detected by measuring the change in the inductance of a wire loop associated with the space, and providing means which is sensitive to the change of the inductance of the loop when the space is not occupied and the inductance when the space is occcupied by an object such as a railway car or other vehicle. In these previous systems, it has been found difficult to maintain the apparatus in its proper working condition, since changes in weather will cause changes to take place in the normal inductance of the loop, and if the apparatus is sufficiently sensitive to detect the small change in inductance due to the presence of a metallic object within the protected area, the apparatus may function improperly if the inductance of the loop changes due to weather conditions or other variables.

Accordingly, it is an object of my invention to provide an electro-magnetic proximity detector which will respond to the relatively rapid change in the inductance of a wire loop caused by the entrance or presence of a car or vehicle within the space associated with the loop, but will not be adversely affected by relatively slow changes of the loop inductance.

A further object of my invention is to provide a self-balancing electro-magnetic proximity detector in which the area to be protected has associated therewith a wire loop which comprises a portion of the frequency determining circuit of an electron tube oscillator, so that the frequency of the oscillations produced by the oscillator are dependent upon the inductance of the loop. Frequency correcting means governed by the output of the oscillator cause the frequency of the oscillator to be maintained at a normal value despite slow changes in the inductance of the loop. When the inductance of the loop changes rapidly, the frequency correcting means is disabled, and the presence of a car or vehicle is indicated. The frequency of the oscillator output is recurrently changed to detect the proper operation of the apparatus.

A further object of my invention is to provide an improved self-balancing electro-magnetic proximity detector.

I shall describe one form of apparatus embodying my invention and shall then point out the novel features thereof in claims.

In practicing my invention, I provide an oscillator of the type in which a parallel resonant circuit comprising a capacitance and an inductance formed by a wire loop determines the frequency of oscillation. The wire loop is disposed and arranged with respect to the area to be protected so that the entrance of a metallic object within the area associated with the loop will cause the inductance of the loop to vary and accordingly vary the frequency of the oscillator. The presence of a metallic object in proximity to the loop will cause the apparent inductance of the loop to decrease and accordingly cause an increase in the oscillator frequency. The output of the oscillator is supplied to a suitable amplifier and thence to a conventional limiter and discriminator circuit, well-known in the art, with the parts proportioned and arranged so that the output of the discriminator will be a positive or negative direct voltage depending upon whether the frequency of the oscillator is increased or decreased from its normal or center frequency. This direct current output from the discriminator is supplied to a modulator of suitable type, which converts the direct current into an alternating current having one phase relationship or another with a reference alternating current depending upon whether the discriminator output is positive or negative in polarity. This alternating current energy is supplied through a suitable amplifier circuit to one winding of a two-phase correcting motor, the other phase of which is supplied with energy from the source of reference current. The parts are arranged and proportioned so that the correcting motor is rotated in one direction with an increase in frequency of the oscillator output and rotated in the other direction with a decrease in frequency of the oscillator output, while the motor does not operate as long as the frequency of the oscillator remains at its center frequency. The correcting motor, through the medium of suitable mechanical linkages, operates a small variable or trimmer capacitor connected across the resonant circuit of the oscillator, in such manner that when the frequency of the oscillator varies in one direction or the other the operation of the motor will cause the trimmer capacitor to either add or subtract a sufficient amount of capacity to bring the frequency back to the center frequency. Accordingly, the system is self-balancing with respect to frequency, so that if the inductance of the detecting loop slowly changes by a small amount, due to weather conditions for example, the frequency correcting apparatus will cause the resonant circuit of the oscillator to be retuned so that the frequency of the oscillator remains substantially constant.

To provide "fail-safe" operation, the apparatus is arranged to be recurrently operated at a certain coding frequency, in such manner that the operation of the apparatus is continuously checked. To provide such operation, I provide a coding device which is arranged to recurrently connect a small capacitor across the output of the oscillator in such manner as to recurrently change the oscillator frequency by a predetermined amount. Additionally, I provide a circuit which is supplied with the alternating current for the operation of the correcting motor, including a suitable amplifying tube which has connected in its anode circuit a code following type of relay so that when the discriminator supplies either positive or negative voltage in response to a change of frequency of the oscillator output, the code following relay will have its contacts picked up. During the time that the discriminator voltage is reduced to a minimum or zero amount, as when the oscillator is supplying its normal frequency output, the relay will have its contacts released. Since the code transmitter is recurrently connecting a small capacitor across the resonant circuit of the oscillator, it will be apparent that under normal conditions the discriminator will supply pulses of energy to the amplifying tube to cause the code following relay to recurrently operate its contacts. The recurrent operation of the contacts of the code following relay is detected by suitable code detecting means, including a slow release relay the contacts of which may govern circuits which indicate the presence or absence of an object within the protected area.

In order that the frequency correcting apparatus does not respond during the time that the system is unbalanced as a result of the presence of an object in the protected area, I arrange the circuits in such manner that the line phase of the correcting motor is interrupted at such times, so that it cannot operate to restore the frequency to its normal value.

The single accompanying drawing shows a preferred embodiment of apparatus for detecting the presence of a railway vehicle on a stretch of track, as embodying my invention, but it will be understood by those skilled in the art that my invention is not limited to use in connection with the detection of railway vehicles, but may be employed in any case in which the presence of a metallic object within a specific area is to be detected.

Referring to the drawing, there is shown a section of railway track T, having track rails 1 and 3, over which railway vehicles may move in either direction. A loop of wire designated in the drawings as the detecting loop and which may comprise one or more turns, is associated with the section of track T, in the manner indicated, with the intent of detecting the presence of a vehicle within the section of track circumscribed by the loop. The detecting loop may, of course, be disposed in other configurations, depending upon the size and shape of the area to be protected. The detecting loop has its ends connected across a circuit including a capacitor C1, to form a parallel resonant circuit for an electron tube oscillator which includes the vacuum tube V1. As shown on the drawing, the oscillator is of the well-known transitron type, although it will be recognized by those skilled in the art that other types of oscillators may be employed. The transitron oscillator is characterized by its simplicity, good frequency stability, and its ability to oscillate with a relatively low Q in the resonant circuit portion of the oscillator.

Energy for the operation of the oscillator as well as the other portions of the equipment is supplied from a direct current source the positive terminal of which is designated by the reference character B+, and the negative terminal of which is grounded.

It will be seen, at this time, that the oscillator including the vacuum tube V1 is continuously supplied with energy from the direct current source, and the oscillator will operate to produce oscillations at a frequency determinated by the inductance and capacitance connected thereto. The inductance and capacitance associated with the oscillator comprise the inductance of the detecting loop, together with the capacity of the main tuning capacitor C1, the trimmer tuning capacitor C2, and the coding capacitor C3, of which the capacitor C1 together with the detecting loop mainly determine the frequency of oscillation. The purposes of the trimmer tuning capacitor C2 and the coding capacitor C3 will be explained subsequently. The frequency at which the oscillator operates normally, that is, with the protected area associated with the detecting loop unoccupied, will be hereinafter referred to as the normal or center frequency.

The output of the oscillator is supplied to a conventional amplifier and thence to a limiter and discriminator of the type well-known in frequency modulation systems, and the parts are proportioned and arranged so that when the oscillator output is at its normal or center frequency the direct current voltage output of the discriminator is substantially zero. When the frequency of the oscillator output varies in one direction, a direct current output is supplied from the discriminator having a given polarity, and when the frequency of the oscillator varies in the opposite direction, the direct current output of the discriminator has the opposite polarity. The output of the discriminator is connected to the grid of an amplifier tube V4 by way of a modulator comprising the diodes V2 and V3, together with the associated resistors R1 and R2, which are connected to the end terminals of the center tapped secondary winding of the transformer T1, the primary winding of which is supplied from a source of alternating current energy designated by the reference characters BX110 and NX110. The modulator circuit functions in such manner that the energy supplied to the grid of the amplifier tube V4 will essentially comprise a square wave having the same frequency as the energy supplied to the motor and which has a phase relationship to the alternating current supply voltage which is determined by the polarity of the direct current output from the discriminator. That is, when the discriminator output voltage has one polarity, the alternating current energy supplied to the grid of the vacuum tube V4 will have a particular phase relationship with the energy supplied from the source BX110 and NX110, and when the direct current output of the discriminator has the opposite polarity, the phase relationship with the energy supplied to the grid of tube V4 will have a phase shift of 180° from its other value.

The type of modulator used to modulate the direct current output of the discriminator is immaterial insofar as the operation of the apparatus embodying my invention is concerned, and types other than that shown may be used. Several such types including the type shown on the drawing are shown on page 251 of the text "Automatic Feed-back Control" by Ahrendt and Caplin, first edition, published in 1951 by McGraw-Hill Book Company, Inc. The modulated energy supplied to the amplifier including tube V4 is amplified and supplied to a second tuned amplifier including the tube V5 together with the transformer T2, which has its primary winding tuned by a suitable capacitor connected across the winding, so that the square wave energy supplied to the amplifiers V4 and V5 from the modulator is converted to substantially sinusoidal alternating current voltage the phase of which with respect to the line voltage is determined by the polarity of the discriminator output. The secondary winding of transformer T2 supplies energy to the grid of the power amplifier tube V6, which has connected to its cathode one winding of a two phase correcting motor M. The resistor and by-pass capacitor associated with the cathode of tube V6 provides the usual biasing arrangement for biasing the tube V6 to its proper operating point.

From the foregoing, it will be seen that the apparatus is arranged so that alternating current energy is supplied to one winding of the motor M, when the discriminator output is other than zero, and that the phase relationship of the alternating current energy supplied to the control winding of the motor is dependent upon the polarity of the direct current output of the discriminator. The second or line winding of the motor M is supplied with energy from the alternating current source by a circuit which includes back contact c of a code following relay CFR, front contact b of the code detecting relay BSA, back contact b of a coding relay CTR, and a capacitor C5. The capacitor serves to shift the phase of the energy supplied to the line winding of the motor M by 90°, and with the apparatus arranged as shown, the shaft of motor M will rotate in one direction or the other depending upon the phase relationship between the energy supplied to the line winding and to the control winding of the motor. It will also be seen that the line winding of the motor M is opened at any time that the contacts of the code following relay CFR or the coding relay CTR are picked up or at any time that the contact b of code detecting relay BSA is released. Accordingly, the motor M can operate only when the contacts in the line winding circuit are closed, and when the discriminator voltage is other than zero, with the direction of rotation being determined by the polarity of the discriminator voltage.

The trimmer capacitor C2, connected across the resonant circuit of the oscillator, is connected by suitable mechanical linkages to the motor M, so that rotation of the motor M causes the trimmer capacitor C2 to be varied in such manner as to add or subtract capacitance to the resonant circuit of the oscillator. Accordingly, it will be seen that operation of the motor M will serve to increase or decrease the frequency of the output of the oscillator by an amount determined by the rotation of the motor M. The parts are constructed and arranged so that if the frequency of the oscillator drifts for any reason, such as weather changes which cause a relatively slow change in the inductance of the loop, the discriminator voltage will assume some value, either positive or negative, and accordingly energy will be supplied to the motor M to thereby operate the trimmer capacitor which adds or subtracts sufficient capacity to the resonant circuit to bring the frequency back to its normal or center value, with a resulting reduction in the discriminator output voltage. Accordingly, the system provides a self-balancing feature which normally holds the output frequency of the oscillator at a predetermined value despite slow changes in the resonant circuit, including the inductance of the detecting loop, which determines the frequency of oscillation.

The relay tube V7 has its grid supplied with energy from a tap on the secondary winding of the transformer T2, and has the winding of the code following relay CFR connected in its plate circuit, so that when energy is supplied from the secondary winding of the transformer T2 to the tube V7, the relay CFR will pick up its contacts, and when no energy is supplied to the grid of the tube from the secondary winding of transformer T2, the relay CFR will have its contacts released. The operating point for the tube V7 is selected by means of the adjustable voltage divider connected in the cathode circuit of the tube. Accordingly, it will be seen that the relay CFR will have its contacts recurrently operated if impulses of energy of sufficient magnitude, whether positive or negative in polarity, are supplied from the discriminator output. The operating point of the tube V7 is selected by adjusting the potentiometer connected to its cathode in such manner that energy supplied to the grid of the tube as the result of the normal balancing operation previously described will be insufficient to cause operation of the contacts of the relay.

However, when a train or vehicle enters the area protected by the loop, the discriminator output voltage will be of sufficient magnitude to cause the tube V7 to conduct sufficient current so that the relay CFR will be picked up and its contacts will remain picked up during the time that the train or vehicle occupies the section of track enclosed by the loop. It will be seen that during the time that relay CFR is picked up, its contact $c$ opens the circuit for supplying energy to one winding of the two-phase motor M, so that the frequency correction is not applied at this time.

In order that the system may be self-checking to provide "fail-safe" operation, the apparatus is arranged so that the system is recurrently unbalanced and the recurrent operation of the code following relay CFR is detected to provide a check of the apparatus.

A coding action is provided by the apparatus comprising a code transmitting relay CTR, a gas diode V8, together with an associated resistor and capacitor which form a relaxation oscillator, well known in the art, with the parameters adjusted so that the firing of the gas diode V8 will cause a momentary operation of the contacts of relay CTR. Each time that the relay CTR picks up, its contact $a$ momentarily closes a circuit which connects the capacitor C3 in parallel with the capacitors C1 and C2 and the detecting loop, in the resonant circuit of the oscillator. During the time that capacitor C3 is connected to the circuit, the frequency of the oscillator output is decreased by a certain amount, so that a direct current voltage is supplied from the output of the discriminator. This voltage is modulated by the modulator circuit and supplied through the amplifier circuit to the control winding of the motor M, and is additionally supplied to the grid of the relay tube V7. The components are selected and arranged so that the value of the energy supplied to the relay tube V7 is sufficient to cause the tube to conduct with the result that the code following relay CFR will pick up its contacts. When contact $b$ of relay CTR and/or contact $c$ of relay CFR is picked up, no energy is supplied to the line winding of the motor M, so that the motor M does not operate the capacitor C2 to bring the frequency back to the normal or center value during the short interval in which the capacitor C3 is connected to the output of the oscillator. When the contact $a$ of relay CTR releases, the capacitor C3 is disconnected from its oscillator circuit, so that the frequency returns to its normal or center value, with the result that no energy is supplied from the output of the discriminator and accordingly the energy supplied to the tube of the relay tube V7 is insufficient to keep the tube conducting, with the result that the code following relay CFR releases. As long as the contacts of the relay CTR are recurrently operated, the apparatus operates in the manner described above, so that the contacts of the code following relay CFR are recurrently operated between their released and picked up positions. This recurrent operation is detected by the relays FSA and BSA, which are arranged in the manner well-known in the coded railway signaling art, so that when contact $a$ of relay CFR is picked up, energy is supplied to the winding of relay FSA, which is snubbed by a capacitor connected across its winding, to thereby render the relay FSA slow in releasing. The parts are proportioned and arranged so that as long as the contact $a$ of relay CFR is recurrently picked up and released the supply of energy to relay FSA and the associated snubbing capacitor will be sufficient to keep the relay picked up during the intervals in which the contact $a$ is released. When the contact $a$ of relay CFR is released, energy is supplied to the winding of relay BSA by a circuit including back contact $a$ of relay CFR and the front contact of relay FSA, and relay BSA is designed and proportioned so that the contacts will not release during the intervals in which contact $a$ of relay CFR is picked up. The contacts of relay BSA, such as contact $a$ shown on the drawing, may control various circuits to indicate the occupied or unoccupied condition of the stretch of track T which is associated with the detecting loop.

It will be obvious to those skilled in the art that a suitable inductance may be substituted for the capacitor C3 to produce recurrent shifts in the oscillator frequency in response to the operation of relay CTR.

The normal condition of the apparatus having been described above, it will now be assumed that a train or vehicle on the track section T moves into the area protected by the wire detecting loop. Accordingly, the inductance of the detecting loop is decreased, causing a corresponding increase in the frequency of the oscillator output. This increase in frequency causes a direct current output voltage to be supplied from the discriminator to the modulator circuit, and a 60 cycle alternating current voltage having a particular phase relationship with respect to the alternating current line voltage supplied at the terminals BX110 and NX110 will be supplied to the amplifier stages including the vacuum tubes V4 and V5, and thence to the motor control tube V6 from whence it is supplied to the control winding of the motor M. The energy supplied to the motor M will be of the phase to normally cause rotation of the motor in such a direction to operate the trimmer capacitor to restore the frequency to its normal value. However, at this time relay CFR will be picked up by the energy supplied to the relay tube V7 from the secondary winding of transformer T2, and thus the line winding of the motor M will be open, so that no rotation of the motor M can take place. With the relay CFR continuously picked up, the supply of energy to the winding of relay BSA is interrupted and the contacts of relay BSA will release after a short time interval, so that the circuits governed by the contacts of relay BSA will indicate the presence of a train or vehicle within the protected area. Additionally, when contact b of relay BSA opens, it further interrupts the circuit for supplying energy to the line winding of the motor M, so that the motor M cannot operate at this time.

With contact b of relay CFR picked up, a circuit is established for shunting the winding of the code transmitting relay CTR, so that even though the relaxation oscillator continues to operate, energy supplied therefrom is shunted around the winding of the transmitting relay so that contact a of the transmitting relay remains open. It is necessary to have the transmitting relay governed by the code following relay in this manner since if a train or vehicle should enter the protected area, moving at a relatively low speed, the inductance of the loop would not change rapidly and accordingly the connection of the capacitor C3 across the circuit at this time, should the contact a of relay CTR be operating, might cause the output frequency of the oscillator to be restored to its normal value. Accordingly, under such conditions the code following relay CFR would continue to operate, with a train or vehicle standing part way in the protected area. However, with the circuit arranged as shown, the contact b of relay CFR shunts the winding of relay CTR so that the capacitor C3 cannot be inserted in the circuit at this time, with the result that the code following relay CFR will remain picked up during the time that the train or vehicle occupies the loop area.

When the train or vehicle moves away from the protected area, the frequency of the oscillator is restored to its normal or center frequency, since the inductance of the loop resumes its previous value. Accordingly, energy is no longer supplied from the discriminator so that alternating current energy supplied through the modulator and amplifier tubes to the relay tube V7 is reduced to a value such that the relay tube V7 will no longer conduct sufficient energy to maintain the contacts of relay CFR picked up. When contact b of relay CFR releases, the code transmitting relay CTR is again able to operate on each pulse of the relaxation oscillator, so that contact a of relay CTR recommences connecting the capacitor C3 across the resonant circuit of the oscillator, with the result that the apparatus resumes its coding action as previously described. With the contact a of relay CFR again in recurrent operation, energy is supplied to the code detecting relays FSA and BSA, with the result that their contacts pick up to thereby indicate that the area protected by the detecting loop is unoccupied. Moreover, at this time contact b of relay BSA is picked up and each time that contact c of relay CFR releases, energy is supplied to the line winding of the two-phase motor M, so that if the frequency of the oscillator is drifting at this time, the trimmer capacitor C2 will be operated in such manner as to restore the frequency to its normal or center value, as was previously described.

Provision of the code following action in this apparatus provides for "fail-safe" operation, since it will be seen that any type of defect which causes the relay CFR to be either continuously energized or continuously deenergized will result in the release of the relay BSA, which will give the same operation as though a train or vehicle were occupying the protected area, which is considered to be a "safe-failure."

It will be obvious to those skilled in the art that the apparatus may be arranged in different manners depending upon the conditions to be fulfilled, for example, the trimmer capacitor C2 could be driven by a reversible direct current motor, supplied with energy governed by sensitive relays responsive to the direct current output of the discriminator, rather than by supplying alternating current energy to a two-phase motor as shown in the present arrangement. Additionally, the modulator circuit shown is not the only type which may be used in this application, but, as previously pointed out, other suitable arrangements for converting the direct current output of the discriminator to an alternating current may be employed.

Although I have herein shown and described only one form of self-balancing electro-magnetic proximity detector embodying my invention, it is to be understood that various changes and modifications may be made therein, within the scope of the appended claims without departing from the spirit and scope of my invention.

Having thus described my invention, what I claim is:

1. A system for detecting the occupancy of a protected area by a metallic object, comprising, in combination, a loop of insulated wire associated with said area, an electron tube oscillator having a frequency determining circuit formed by the inductance of said wire loop and including a main tuning capacitor, a variable tuning capacitor and a coding capacitor, connected in multiple, whereby the normal frequency of the output of said oscillator is varied by the change in inductance of said wire loop, according as the area is or is not occupied by a metallic object, frequency discriminator means connected to said oscillator and proportioned and arranged to provide a direct current output the magnitude and polarity of which are directly related to the direction and amount by which the frequency of said oscillator varies from its normal frequency, motor means for operating said variable tuning capacitor, said motor means being governed by said discriminator means and arranged so that said variable capacitor is varied in such manner as to reduce the output of said discriminator to a minimum value, whereby the frequency of said oscillator is maintained at its normal value despite relatively slow changes in the inductance of said wire loop, a code-following relay governed by said discriminator means and arranged so that its contacts are picked up when and only when the magnitude of the discriminator output exceeds a predetermined value, code detecting means governed by the recurrent operation of said contacts of said code-following relay, and coding means for recurrently connecting and disconnecting said coding capacitor from the frequency determining circuit of said oscillator to cause the frequency to vary by an amount sufficient to produce a discriminator output in excess of said predetermined value.

2. A system for detecting the occupancy of a protected area by a metallic object, comprising, in combination, a loop of insulated wire associated with said area, an electron tube oscillator having a frequency determining circuit formed by the inductance of said wire loop and including a main tuning capacitor, a variable tuning capacitor and a coding capacitor, connected in multiple, whereby the normal frequency of the output of said oscillator is varied by the change in inductance of said wire loop, according as the area is or is not occupied by a metallic object, frequency discriminator means connected to said oscillator and proportioned and arranged to provide a direct current output the magnitude and polarity of which are directly related to the direction and amount by which the frequency of said oscillator varies from its normal frequency, motor means for operating said variable tuning capacitor, said motor means being governed by said discriminator means and arranged so that said variable capacitor is varied in such manner as to reduce the output of said discriminator to a minimum value, whereby the frequency of said oscillator is maintained at its normal value despite relatively slow changes in the inductance of said wire loop, a code-following relay governed by said discriminator means and arranged so that its contacts are picked up when and only when the magnitude of the discriminator output exceeds a predetermined value, code detecting means governed by the recurrent operation of said contacts of said code-following relay, and coding means for recurrently connecting and disconnecting said coding capacitor from the frequency determining circuit of said oscillator to cause a shift in frequency sufficient to produce a discriminator output in excess of said predetermined value, said coding means comprising a coding relay recurrently energized with pulses of energy, and having its winding governed by a contact of said code-following relay in such manner that the coding relay is prevented from operating when the contacts of said code following relay are picked up.

3. A system for detecting the occupancy of a protected area by a metallic object, comprising, in combination, a loop of insulated wire associated with said area, an electron tube oscillator having a frequency determining circuit formed by the inductance of said wire loop and including a main tuning capacitor, a variable tuning capacitor and a coding capacitor, adapted to be connected in multiple, whereby the normal frequency of the output of said oscillator is varied by the change in inductance of said wire loop, according as the area is or is not occupied by a metallic object, frequency discriminator means connected to said oscillator and proportioned and arranged to provide a direct current output the magnitude and polarity of which are directly related to the direction and amount by which the frequency of said oscillator varies from its normal frequency, a source of alternating current energy, frequency correcting means comprising a motor having a line phase winding and a control phase winding and arranged to drive said variable tuning capacitor, the direction of rotation of said motor being dependent on the phase relationship of the energy supplied to said line phase winding and said control phase winding, a first circuit for supplying energy from said source of alternating current to said line phase winding of said motor, modulator means having input circuits connected to said source of alternating current energy and said discriminator and having an output circuit for supplying energy to said control phase winding of said motor with a phase relationship and magnitude directly related to the polarity and magnitude of said discriminator output voltage, the parts being arranged so that said variable capacitor is varied in such manner as to reduce the output of said discriminator to a minimum value, whereby the frequency of said oscillator is maintained at its normal value despite relatively slow changes in the inductance of said wire loop; a code-following relay governed by said discriminator means and arranged so that its contacts are picked up when and only when the magnitude of the discriminator output exceeds a predetermined value, coding means for recurrently changing the frequency of said oscillator by an amount such that the output of said discriminator means recurrently exceeds said predetermined value comprising a coding relay supplied with impulses of energy to thereby recurrently pick up and release the contacts of said coding relay, a circuit including a picked up contact of said coding relay for recurrently connecting said coding capacitor to said frequency determining circuit, and a circuit maintaining said coding relay released when said code following relay contacts are picked up; code detecting means including a slow release relay governed by said code following relay for detecting the recurrent operation of said code following relay, and said first circuit including in series a contact of said coding relay, a contact of said slow release relay and a contact of said code following relay for interrupting the supply of energy to said line phase winding of said motor.

References Cited in the file of this patent
UNITED STATES PATENTS

| | | |
|---|---|---|
| 1,658,953 | Theremin | Feb. 14, 1928 |
| 2,112,826 | Cook | Apr. 5, 1938 |
| 2,454,687 | Baughman | Nov. 23, 1948 |
| 2,488,815 | Hailes | Nov. 22, 1949 |
| 2,580,155 | Brannen | Dec. 25, 1951 |
| 2,640,978 | Claesson | June 2, 1953 |